United States Patent [19]

Ladang

[11] Patent Number: 4,806,162

[45] Date of Patent: Feb. 21, 1989

[54] FLAME RESISTANT POLYMERS

[75] Inventor: Michel Ladang, Herve, Belgium

[73] Assignee: Norton Company, Worcester, Mass.

[21] Appl. No.: 193,468

[22] Filed: May 13, 1988

Related U.S. Application Data

[62] Division of Ser. No. 125,036, Nov. 24, 1987.

[51] Int. Cl.$^4$ ............................ C08L 1/18; C08V 9/00
[52] U.S. Cl. .................................. 106/18.13; 524/141;
524/143; 524/405; 524/412; 524/437; 521/85;
521/92; 521/98; 521/145; 521/146; 521/907
[58] Field of Search ..................... 106/18.13; 524/141,
524/143, 405, 412, 437

[56] References Cited

U.S. PATENT DOCUMENTS

| | | | |
|---|---|---|---|
| 3,560,441 | 2/1971 | Schwarcz et al. | 260/45.75 |
| 3,951,894 | 4/1976 | Whelan, Jr. | 524/112 |
| 3,953,650 | 4/1976 | Sauer et al. | 428/389 |
| 4,089,912 | 5/1978 | Levek et al. | 252/400 R |
| 4,182,799 | 1/1980 | Rodish | 521/98 |
| 4,246,359 | 1/1981 | Whelan | 521/92 |
| 4,342,851 | 8/1982 | Suzui et al. | 528/390 |
| 4,343,854 | 8/1982 | Moorman | 524/466 |

*Primary Examiner*—Morton Foelak
*Attorney, Agent, or Firm*—Arthur A. Loiselle, Jr.

[57] ABSTRACT

A combination of materials is disclosed which imparts superior fire retardant properties to organic polymers and the gaseous by-products of those polymers. The combination is made up of an organo phosphate plasticizer, aluminum hydroxide or alumina hydrate, antimony trioxide, a borate, a brominated hydrocarbon and a chlorinated paraffin.

3 Claims, No Drawings

FLAME RESISTANT POLYMERS

This application is a division of application Ser. No. 125,036, filed Nov. 24, 1987.

TECHNICAL FIELD

The invention relates to flame resistant polymers and the combination of materials which render the polymers flame resistant.

BACKGROUND AND INFORMATION DISCLOSURE STATEMENT

The following publications are representative of the most relevant prior art known to the Applicant at the time of filing of the application.

| United States Patents | | |
|---|---|---|
| 3,560,441 | February 2, 1971 | M. Schwarcz et al |
| 3,953,650 | April 27, 1976 | E. S. Sauer et al |
| 4,089,912 | May 16, 1978 | R. P. Levek et al |
| 4,182,799 | January 8, 1980 | J. Rodish |

As the use of plastics has grown in recent years in such areas as construction, automobiles and aircraft, so too has the concern over the flammability of these materials. To respond to that concern, the industry has discovered and introduced into the plastics or polymers various fire retardant materials either singularly or as a flame retardant systems made of several materials. While the currently used flame retarding materials have brought about a significant decrease in the flammability of many of the more widely used polymers, there is still substantial room for improvement. It is this specific problem which the present invention address.

The Schwarcz et al reference discloses a flame and smoke retarding system for polymers such as polyethylene, polypropylene, polyesters, polyvinyl chloride and the like. The system is made up of antimony trioxide and one or more compounds from the group sodium borate, lithium borate, zinc borate, ammonium borate, potassium orthophosphate, sodium phosphate, sodium fluoro phosphate, lead oxide, sodium aluminate, sodium aluminum fluoride, boric anhydride, phosphorous pentoxide, sodium pyrophosphate, barium oxide, sodium carbonate, cobaltous carbonate, calcium oxide, magnesium oxide and sodium antimonate. The inorganic compounds in powder form, are mixed and then heated to fusion. The resultant glass is pulverized and incorporated in the polymer in the conventional manner. The reference compares its flame retardant system with antimony trioxide alone, compounded with polyvinyl chloride. The flame retardancy effect of all of the additions to the polyvinyl chloride was about the same, measured by how far the flame spread and how much smoke was generated. However, the flame retardant of the reference did reduce the degree of yellowness which occurred in polyvinyl chloride samples upon heating.

Clear polyvinyl chloride is made flame resistant while maintaining clarity, by the addition to a novel polyvinyl chloride plastisol composition, of a phosphate plasticizer, according to the Sauer et al patent. The phosphate plasticizer is added in an amount of 3–50 parts by weight per 100 parts by weight of the polymer. While not part of the invention claimed by the Sauer et al patent, the reference does mention brominated monomeric triallyl phosphate as a flame retardant.

The novelty in the Levek et al patent resides primarily in the addition to a styrene based polymer, a stabilizer which reduces decomposition of the polymer by heat. The reference is relevant to the present invention because the polymer system also incorporates a flame retarding system made up of antimony trioxide and a bromine containing organic compound such as tetrabromobisphenol-A, octobromodiphenyl ether or the like. Levek et al also mentions that flame retardants such as tricresyl phosphate, zinc borate, ammonium polyphosphate, sodium antimonate and the like may be used in place of antimony trioxide.

The Rodish reference contributes to the art by virtue of a flame retardant for polystyrene made up of four materials viz a halogenated hydrocarbon, antimony trioxide, zinc borate, and a hydrate of alumina. The first three materials are well known flame retardants. The hydrated alumina, preferably the trihydrate, functions not as a flame or combustion suppressant but rather as a smoke depressant. Hydrated alumina, both the mono- and tri-hydrates when present in the polystyrene to the extent of 16–28 percent by weight, substantially depresses the amount of smoke generated when the polystyrene burns, by giving off its water of hydration. The hydrated alumina also restricts access of the polystyrene to oxygen thereby discouraging combustion. Obviously, this four component flame retardant does not eliminate polystyrene's combustibility but rather just reduces it as do the other multi component prior art flame retardant systems. The present invention does not totally eliminate the flammability characteristic of organic polymers but it does produce an unexpected further decrease in that property.

DISCLOSURE OF THE INVENTION

The organic polymers of the invention, useful as a gasket material, sound and heat insulating foamed board and the like, result from addition to the base polymer composition, a unique combination of flame retardants that produces a polymer system superior to polymer systems containing prior art retardants.

The flammability properties of essentially any polymer that can be plasticized, i.e. externally plasticized, can be improved by incorporating in the polymer, the flame retardant system of the instant invention. Among such polymers are polyvinyl chloride cellulose nitrate, ethyl cellulose, unsubstituted hydrocarbon rubber, chlorinated rubber, nitrile rubber and styrene-butadiene rubbers. The polymers may be in the form of foamed or non-foamed products. Examples of the former are foamed insulating board for use in housing, refrigerator walls and doors, and as gaskets; the latter non foamed type include sheet material and other solid products especially those associated with electrical applications.

The flame retardant system to be added to the polymer is made up of at least five specific types of materials with flame and/or smoke inhibiting properties, and preferable six. When the smoke and flame retardant mixtures is made up of five materials, the composition should be, on a parts by weight basis per 100 parts of polymer, 20 to 120 parts of an organo phosphate plasticizer, 1 to 15 parts of antimony trioxide, 5 to 60 parts of aluminum hydroxide or alumina hydrate, 1 to 15 parts of a borate, and 1 to 20 parts of a brominated hydrocarbon. When a sixth material is used it is 5 to 30 parts of a chlorinated paraffin.

Examples of the organo phosphate plasticizers are tricresyl phosphate, cresyldiphenyl phosphate, octyldiphenyl phosphate, and other triaryl phosphates. Suitable borates are zinc borate, sodium borate, lithium borate, and ammonium borate; the borates function as flame and smoke retardants by giving off water and forming the non-flammable glass $B_2O_3$; there is also believed to be a synergistic effect between the borate and aluminum hydroxide (or alumina hydrate) and antimony trioxide. An important contributor to the overall effect of the flame/smoke retarding system of the invention is the brominated hydrocarbon and the more highly brominated the better. Ideal are such highly brominated compounds like decabromodiphenyl, decarbromodiphenyl ether, hexabromobenzene, hexabromobiphenyl, and hexabromocyclododecane. These materials are believed to function as retardants through the generation of HBr which inhibits the access of oxygen to the polymer surface which has started to burn. While it is not quite understood, in view of all of the bromine present, the addition of a chlorinated paraffin appears to enhance the overall effect of the combination of organo phosphate, borate, brominated hydrocarbon, antimony trioxide and aluminum hydroxide or alumina trihydrate.

It should be understood that while the present flame/smoke retardant is compatible with many plasticized polymers, the normal formulation of those polymers will most likely have to be adjusted to accommodate the members of the retardant system. For example, some thermoplastic polymers utilize certain levels of a phthalate plasticizer to produce certain physical properties in the final product. If those same properties are to be retained and an effective amount of the present retardant system is to be incorporated in the polymer composition, then an adjust down of the amount of phthalate will have to be made to accommodate the effect of the addition of the phosphate plasticizer of the retardant system of the invention. The same is true of the brominated and chlorinated hydrocarbons; these will have a minor plasticizing effect and must be considered when formulating the polymer composition.

EXAMPLE OF THE PREFERRED EMBODIMENTS

A series of plasticized polyvinyl chloride foams, Examples 1-8, were prepared having a density of about 175 kg/m³. The compositions included a standard polyvinyl chloride composition containing only 6 parts per 100 parts of polymer of antimony trioxide flame retardant (Example 1), several compositions which incorporated prior art flame retardants (Examples 2-5), and three formulations which utilized the flame retardant system of the present invention. The specific materials that went into the eight formulations were selected from the following:

1. Polyvinyl chloride - Vinnol E 68 CF and Vinnol E 72 CF from the Wacker Chemical Co.; Solvic 364 MB from Solvay; Hostalit P90 70 from Kunststoffe Hoechst.
2. Phthalate plasticizer - diisodecyl phthalate; Mesamoll from Bayer A.G.; Lankroflex GE from Lankro Benelux S.A.
3. Chlorinated paraffin - Cereclor 52 from I.C.I.
4. Blowing agent and activator - Genetron AC SP4 from Schering industrial chemicals; Ferro 5473 A from Ferro (Holland) B.V.
5. Black pigment - 25% by weight of carbon black dispersed in a DIDP plasticizer from Chin Ghall Limited.
6. Cell regulator - B67MT from Rohm & Haas, Company.
7. Bacteriacide - Vynizene from Morton Thiokol Inc.
8. Zinc borate.
9. Antimony trioxide.
10. Phosphate plasticizer - Santicizer 141 and Santicizer 148 from Monsanto Co., Disflamoll DPK (disphenylcresyl phosphate) and Disflamoll TKP (tricresyl phosphate).
11. Aluminum hydroxide; alumina trihydrate.
12. Calcium carbonate.
13. Decabromodiphenyl.

In the conventional manner, the ingredients were thoroughly mixed in a high speed mixer in the desired proportions. The final temperature of the various mixtures was about 30° C. and the viscosity was typically from 2000 to 25,000 centipoises as measured with a Brookfield Viscosimeter using Spindle 5 at 20 rpm. The plastisols were then cast on a release conveyor belt with a gap of between 0.2 to 2.5 millimeters. The cast film was heat treated in an oven during 1 to 5 minutes at 205° C. The resulting foamed sheets had had densities of $170\pm50$ kg/m³ and thicknesses of from 1.5 to 20 millimeters.

The flammability characteristics of foams were tested according to the test procedure described in 8 National and International Fire Protection - Regulations and Test Procedures, 8.2.4 France, pp. 126-136. (AFNOR-=Association Francaise deNormalisation October 1975, NFP92508). The materials tested are classified as follows:

M.0 non-combustible
M.1 non-flammable
M.2 low flammability
M.3 moderately flammable
M.4 high flammability
M.5 extremely flammable Obviously, a classification of M.0 is most desirable. However, if an organic polymer as the base material of the composition of interest it is probably impossible to produce a material that is actually non-combustible, i.e. with a flammability rating of M.0. The present invention has accomplished another step in the direction of an M.0 system over the prior art which heretofore has managed only M.3 rated polymer compositions. Examples 1-5 in Table I, below, are examples of the prior art while Examples 6-8 are those of the present invention. Table 1 shows the compositions of the various materials and their flammability rating. The compositions are in parts by weight of various additives per 100 parts by weight of polymer.

TABLE I

|                | 1  | 2   | 3   | 4   | 5   | 6   | 7   | 8   |
|----------------|----|-----|-----|-----|-----|-----|-----|-----|
| VINNOL E 68 CF | 40 |     |     |     |     |     |     |     |
| SOLVIC 374 MB  |    | 100 |     |     |     |     |     |     |
| VINNOL E 72 CF | 60 |     |     |     |     |     |     |     |
| HOSTALIT P 9070|    |     | 100 | 100 | 100 | 100 | 100 | 100 |
| DIDP           | 55 |     |     |     |     |     |     |     |

TABLE I-continued

|  | 1 | 2 | 3 | 4 | 5 | 6 | 7 | 8 |
|---|---|---|---|---|---|---|---|---|
| CERECLOR 52 |  |  |  |  |  |  |  | 15 |
| MESAMOLL | 30 | 20 | 30 |  |  |  |  |  |
| LANKROFLEX GE | 5 | 10 |  |  |  |  |  |  |
| GENITRON AC SP4 | 6 | 10 | 5 | 6.4 | 5 | 5 | 5 | 5 |
| FERRO 5473 A | 1 | 2 | 2 | 2 | 1.5 | 1.5 | 1.5 | 1.5 |
| BLACK PIGMENT PREDISPERSED IN PLASTICIZER | 4.6 |  | 3.5 |  |  |  |  |  |
| CELL REGULATOR | 1 | 1 | 1 |  |  |  |  |  |
| BIOCIDE | 2.5 | 2.5 | 2 |  |  |  |  |  |
| ZINC BORATE 2335 |  |  | 4 | 10 | 5 | 5 | 5 |  |
| Sb2 03 | 6 | 6 | 4 | 10 | 5 | 5 | 5 | 10 |
| SANTICIZER 148 |  |  | 70 | 45 |  |  |  |  |
| SANTICIZER 141 |  |  |  | 45 | 20 | 20 | 90 | 75 |
| DISFLAMOLL DPK |  | 80 |  |  |  |  |  |  |
| DISFLAMOLL TKP |  |  |  |  | 70 | 70 |  |  |
| MARTINAL ON 313 |  |  | 30 | 45 | 35 | 35 | 35 | 35 |
| Ca C03 |  |  | 30 |  |  |  |  |  |
| ADINE 102 |  |  |  |  |  | 10 | 10 | 10 |
| CLASS | M4 | M3 | M3 | M3 | M3 | M2* | M2 | M2 |

*Some test specimens rated as M1

As pointed out above, the ideal flammability rating is M.0 but as a reality organic polymer compositions with flammability ratings of M.4 and M.5 are considered unacceptable (Example 1) while an M.3 rating receives reluctant approval (Examples 2-5). Polyvinyl chloride compositions according to the invention (Examples 6-8) attain at least an M.2 rating, i.e. low flammability which is a giant step toward the M.0 rating even though it's only a one digit improvement over the prior art. Examples 6 and 7 accomplish this end result with a flame retardant system made up of zinc borate, antimony trioxide, a phosphate plasticizer, aluminum hydroxide, and decabromodiphenyl. Example 8 adds to the flame retardant system of Examples 6 and 7, a chlorinated paraffin.

What is claimed is:

1. A non-foamed organic polymer including a flame retarding system for said polymer and said polymer's gaseous by-products, said flame retarding system comprising 20 to 120 parts by weight of an organo phosphate plasticizer 1 to 15 parts by weight of antimony trioxide, 5 to 60 parts by weight of aluminum hydroxide or hydrated alumina, 1 to 15 parts by weight of a borate, and 1 to 20 parts by weight of a brominated hydrocarbon, all per 100 parts by weight of said polymer.

2. The organic polymer of claim 1 wherein said polymer is a plasticized thermoplastic polymer selected from the group consisting of polyvinyl chloride, cellulose nitrate, chlorinated rubber, nitrile rubber, styrene butadiene rubber, and unsubstituted hydrocarbon rubber.

3. An organic polymer according to claims 1 or 2 wherein said flame retarding system includes 5 to 30 parts by weight of a chlorinated paraffin.

* * * * *